(12) United States Patent
Murray et al.

(10) Patent No.: US 9,020,522 B2
(45) Date of Patent: Apr. 28, 2015

(54) METHOD AND SYSTEM FOR OPTIMIZING UPLOADING OF LOCATION DATA FOR LOCATION BASED SERVICES

(75) Inventors: Dave Murray, Mission Viejo, CA (US); Charles Abraham, Los Gatos, CA (US); Mark Buer, Gilbert, AZ (US); David Garrett, Tustin, CA (US); Jeyhan Karaoguz, Irvine, CA (US); David Lundgren, Mill Valley, CA (US)

(73) Assignee: Broadcom Corporation, Irvine, CA (US)

(*) Notice: Subject to any disclaimer, the term of this patent is extended or adjusted under 35 U.S.C. 154(b) by 832 days.

(21) Appl. No.: 12/732,874

(22) Filed: Mar. 26, 2010

(65) Prior Publication Data

US 2011/0201348 A1 Aug. 18, 2011

Related U.S. Application Data

(60) Provisional application No. 61/304,101, filed on Mar. 12, 2010.

(51) Int. Cl.
*H04W 24/00* (2009.01)
*H04W 4/02* (2009.01)

(52) U.S. Cl.
CPC ........................................ *H04W 4/02* (2013.01)

(58) Field of Classification Search
CPC ..... H04W 24/01; H04W 16/14; H04W 88/06; H04W 8/04; H04N 1/00137; H04N 1/00145; H04N 1/00148; H04N 1/00164; H04L 12/2431
USPC ................... 455/456.1, 405, 427, 456, 456.2; 340/573.4, 539.14, 8.1; 700/83, 9, 67; 707/E17.009; 370/235; 348/207.99; 358/1.15; 705/26.1
See application file for complete search history.

(56) References Cited

U.S. PATENT DOCUMENTS

| | | | |
|---|---|---|---|
| 7,092,999 B2* | 8/2006 | Levitan ........................ 709/218 |
| 2003/0004952 A1* | 1/2003 | Nixon et al. .................... 707/10 |
| 2003/0032435 A1* | 2/2003 | Asada et al. .................. 455/456 |
| 2003/0202104 A1* | 10/2003 | Werner .................... 348/207.99 |
| 2003/0225893 A1 | 12/2003 | Roese et al. |
| 2004/0004737 A1* | 1/2004 | Kahn et al. .................... 358/1.15 |
| 2005/0209927 A1* | 9/2005 | Aaltonen et al. ............... 705/26 |
| 2008/0298238 A1* | 12/2008 | Dawson et al. ............... 370/235 |
| 2009/0069021 A1* | 3/2009 | Barroso ........................ 455/450 |
| 2009/0276517 A1* | 11/2009 | Ruppert ........................ 709/224 |
| 2010/0030972 A1* | 2/2010 | Greenblat ..................... 711/133 |
| 2010/0036595 A1* | 2/2010 | Coy et al. ..................... 701/119 |
| 2010/0248640 A1* | 9/2010 | MacNaughtan et al. ... 455/67.11 |
| 2011/0080890 A1* | 4/2011 | Cai et al. ....................... 370/331 |

* cited by examiner

*Primary Examiner* — Mahendra Patel
(74) *Attorney, Agent, or Firm* — Sterne, Kessler, Goldstein & Fox P.L.L.C.

(57) ABSTRACT

A mobile device may be operable to collect location data for a RF node and cache the collected location data in the mobile device. Resources that may be utilized for improving the uploading of the cached location data to a location server may be determined by the mobile device. The cached location data may be communicated, to the location server for updating a location database, by the mobile device utilizing the determined resources. The mobile device may determine and utilize an opportunistic transport based on a data usage and/or an access. The mobile device may store a subset of the location database locally for comparing with the cached location data for redundancy. The compared location data may be transmitted by the mobile device to the location server for updating the location database if the compared location data are not redundant data.

20 Claims, 4 Drawing Sheets

METHOD AND SYSTEM FOR OPTIMIZING UPLOADING OF LOCATION DATA FOR LOCATION BASED SERVICES

CROSS-REFERENCE TO RELATED APPLICATIONS/INCORPORATION BY REFERENCE

This patent application makes reference to, claims priority to, and claims benefit from U.S. Provisional Application Ser. No. 61/304,101, which was filed on Feb. 12, 2010.

The above stated application is hereby incorporated herein by reference in its entirety.

FIELD OF THE INVENTION

Certain embodiments of the invention relate to communication systems. More specifically, certain embodiments of the invention relate to a method and system for optimizing uploading of location data for location based services.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optimizing uploading of location data for location based services, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for optimizing uploading of location data for location based services. In various embodiments of the invention, a mobile device may be operable to collect location data for a RF node and cache the collected location data locally in the mobile device for deferred uploading. Resources that may be utilized for improving the uploading of the cached location data to a location server may be determined by the mobile device. The cached location data may be communicated to the location server by the mobile device utilizing the determined resources. The location server may comprise a location database which may then be updated utilizing the location data received from the mobile device. In this regard, the mobile device may be operable to determine an opportunistic transport based on a data usage and/or an access. The cached location data may be communicated to the location server by the mobile device utilizing the determined opportunistic transport. In this regard, for example, in instances when the data usage associated with the opportunistic transport is less than a particular cellular data usage, the opportunistic transport may be selected by the mobile device for communicating the cached location data to the location server. In instances when the access to the opportunistic transport by the mobile device becomes available, the opportunistic transport may be selected by the mobile device for communicating the cached location data to the location server.

A subset of the location database may be stored locally in the mobile device. The mobile device may be operable to acquire the stored subset of the location database from the location server, for example. The cached location data may be compared with the subset of the location database stored in the mobile device for redundancy check. The compared location data may be communicated by the mobile device to the location server based on a result of the comparison. In this regard, for example, in instances when the comparison result indicates that the location data are not redundant data, the location data may be transmitted by the mobile device to the location server for updating the location database. In instances when the result of the comparison indicates that the location data are redundant data, the location data may not be transmitted to the location server. The mobile device may be operable to acquire the subset of the location database based on, for example, a capacity of a memory in the mobile device and/or access capability of the mobile device.

Figure 1:
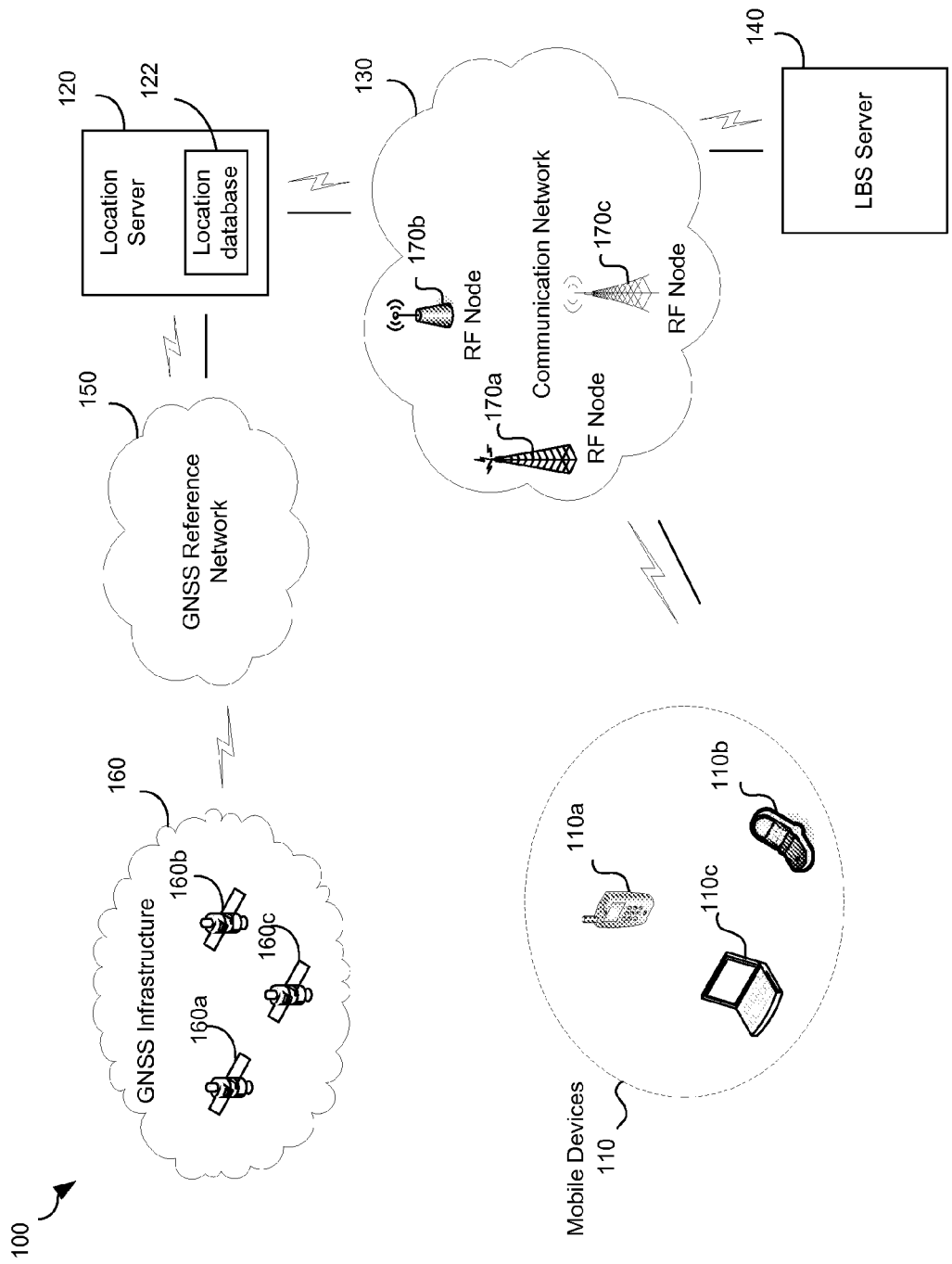
FIG. 1 is a block diagram illustrating an exemplary communication system that is operable to optimize uploading of location data for location based services, in accordance with an embodiment of the invention.

FIG. 1 is a block diagram illustrating an exemplary communication system that is operable to optimize uploading of location data for location based services, in accordance with an embodiment of the invention. Referring to FIG. 1, there is shown a communication system 100. The communication system 100 comprises a plurality of mobile devices 110, of which mobile devices 110a-110c are illustrated, a location server 120 comprising a location database 122, a communication network 130, a LBS server 140, a GNSS reference network 150 and a GNSS infrastructure 160. The communication network 130 may comprise a plurality of RF nodes, of which RF nodes 170a-170c are illustrated. The GNSS infrastructure 160 may comprise a plurality of GNSS satellites, of which GNSS satellites 160a-160c are illustrated.

Each of the mobile devices 110a-110c such as the mobile device 110a may comprise suitable logic, circuitry, interfaces and/or code that may be operable to communicate radio signals across the communication network 130, for example, via the RF nodes 170a-170c. The mobile device 110a may be operable to receive GNSS broadcast signals from a plurality of visible GNSS satellites such as GNSS satellites 160a-160c in the GNSS infrastructure 160. The mobile device 110a may collect and report device-assisted location data, for example, for a RF node such as the RF node 170a to the location server 120 for updating the location database 122.

Instead of uploading collected location data continuously, the mobile device 110a may be operable to cache the collected location data for the RF node such as the RF node 170a locally in the mobile device 110a for deferred uploading. Resources that may be utilized for improving the uploading of the cached location data may be determined by the mobile device 110a. The cached location data may be communicated to a location server such as the location server 120 by the mobile device 110a utilizing the determined resources. In this regard, for example, the mobile device 110a may be operable to determine an opportunistic transport based on a data usage and/or an access. An opportunistic transport may be an alternative transport which may be accessed and utilized by the mobile device 110a to communicate the cached location data to the location server 120. For example, the opportunistic transport may be a WiFi access point at high speed with flat low rate or free of charge while current cellular data usage charge for the mobile device 110a to upload the location data may be high, for example, due to roaming. The cached location data may be communicated to the location server 120 by the mobile device 110a utilizing the determined opportunistic transport. In this regard, for example, in instances when the data usage associated with the opportunistic transport is less than a particular cellular data usage, the opportunistic transport may be selected by the mobile device 110a for communicating the cached location data to the location server 120 so that the data usage may be reduced. In instances when the access to the opportunistic transport by the mobile device 110a becomes available, the opportunistic transport may be selected by the mobile device 110a for communicating the cached location data to the location server 120. In this regard, for example, while the mobile device 110a is on a 2G wireless network, the mobile device 110a may not upload the cached location data unless the mobile device 110a can access the WiFi access point or a 3G wireless network.

A subset of the location database may be stored locally in a memory in the mobile device 110a. The mobile device 110a may be operable, for example, to acquire the stored subset of the location database from the location server 120. For example, the acquired subset of the location database may comprise the location data for the RF nodes 170a and 170b which are within a region of the mobile device 110a. The cached location data may be compared with the subset of the location database stored in the mobile device 110a for redundancy check. The compared location data may be communicated by the mobile device 110a to the location server 120 based on a result of the comparison. In this regard, for example, in instances when the comparison result indicates that the location data such as, for example, the location data for the RF node 170c are not redundant data, the location data for the RF node 170c may be transmitted by the mobile device 110a to the location server 120 for updating the location database 122. In instances when the comparison result indicates that the location data such as, for example, the location data for the RF node 170a are redundant data, the location data for the RF node 170a may not be transmitted to the location server 120. Accordingly, the data usage for uploading the location data may be reduced by communicating or transmitting only non-redundant or new data to the location server 120 for updating the location database 122. The mobile device 110a may be operable to acquire the subset of the location database based on, for example, a capacity of the memory in the mobile device 110a and/or access capability of the mobile device 110a. In this regard, for example, the mobile device 110a may have limited amount of memory for storing the location database. In this instance, only a limited subset of the location database 122 may be acquired from the location server 120 by the mobile device 110a accordingly. The mobile device 110a, for example, may not be enabled to have access to WiFi access points to collect location data for WiFi access points. In this instance, the subset of the location database 122 associated with the WiFi access points may not be acquired from the location server 120 by the mobile device 110a accordingly.

The location server 120 may comprise suitable logic, circuitry, interfaces and/or code that may be operable to access the GNSS reference network 150 to collect GNSS satellite data by tracking GNSS constellations through the GNSS reference network 150. The location server 120 may be operable to utilize the collected GNSS satellite data to generate GNSS assistance data (A-GNSS data) comprising, for example, ephemeris data, LTO data, reference positions and/or time information. The location server 120 may be operable to collect and/or retrieve location information or data from associated users such as the RF nodes 170a-170c and/or the mobile devices 110a-110c. For example, the location server 120 may be operable to receive location information of the RF node 170a from the mobile devices 110a-110c. The received location data may be stored in the location database 122 so that it may be shared among associated mobile devices 110a-110c such as the mobile device 110a. The location server 120 may be operable to communicate the stored location data as A-GNSS data to the mobile device 110a, when need.

The location server 120 may be operable to send a subset of the location database 122 to the mobile device 110a when acquired by the mobile device 110a. The subset of the location database sent to the mobile device 110a may be used by the mobile device 110a to determine whether the location data collected by the mobile device 110a are redundant data comparing to the subset of the location database. In instances when the location data collected by the mobile device 110a are redundant data, the location data may not be transmitted to the location server 120 for updating the location database 122.

The communication network 130 may comprise suitable logic, circuitry, interfaces and/or code that may be operable to provide voice and data services to various mobile devices such as the mobile devices 110a-110c by using wireless and/or wired communication technologies such as, for example, WCDMA, UMTS, HSDPA, CDMA, EV-DO, GSM, GPRS, EDGE, EGPRS, LTE, Bluetooth, WiMAX, WiFi, FM, mobile TV and Ethernet. The communication network 130 may be operable to provide communication among the location server 120, the LBS server 140 and a plurality of served mobile devices such as the mobile devices 110a-110c. The communication network 130 may comprise a plurality of RF nodes such as, for example, the RF nodes 170a-170c. The RF node 170a is a RF network device that may comprise, for example, a cell station, a wireless access point (AP) and/or a FM station.

The LBS server 140 may comprise suitable logic, circuitry, interfaces and/or code that may be operable to provide location based services (LBS). The LBS server may be operable to retrieve information such as, for example, local hotel addresses or a map of the vicinity of areas of interest. The LBS server 140 may be operable to communicate the retrieved information with various communication devices such as the mobile device 110a based on an associated position or location.

The GNSS reference network 150 may comprise suitable logic, circuitry, interfaces and/or code that may be operable to collect and/or distribute data for GNSS satellites 160a-160c on a continuous basis. The GNSS reference network 150 may comprise a plurality of GNSS reference tracking stations or receivers located around the world to provide A-GNSS coverage all the time in both a home network and/or any visited network. The GNSS reference network 150 may be communicatively coupled to the location server 120. The collected GNSS data or information may be utilized by the location server 120 to enhance LBS performance.

Each of the GNSS satellites 160a-160c such as the satellite 160a may comprise suitable logic, circuitry, interfaces and/or code that may be operable to generate and broadcast satellite navigational information. The broadcast satellite navigation information may be collected by the mobile devices 110a-110c, for example. The broadcast satellite navigational information may be collected by the GNSS reference network 150 to be utilized by the location server 120 to enhance LBS performance. The GNSS satellites 160a-160c may comprise, for example, GPS, GLONASS, Galileo and/or Compass satellites.

In operation, the mobile device 110a may collect device-assisted location data, for a RF node such as the RF node 170a to the location server 120 for updating the location database 122. The mobile device 110a may be operable to cache the collected location data for the RF node 170a locally in the mobile device 110a for deferred uploading. Resources that may be utilized for improving the uploading of the cached location data to the location server 120 may be determined by the mobile device 110a. The cached location data may be communicated to the location server 120 by the mobile device 110a utilizing the determined resources. In this regard, the mobile device 110a may be operable to determine an opportunistic transport based on a data usage and/or an access. The cached location data may be communicated to the location server 120 by the mobile device 110a utilizing the determined opportunistic transport. In this regard, in instances when the data usage associated with the opportunistic transport is less than a particular cellular data usage, the opportunistic transport may be selected by the mobile device 110a for communicating the cached location data to the location server 120 so that the data usage may be reduced. In instances when the access to the opportunistic transport by the mobile device 110a becomes available, the opportunistic transport may be selected by the mobile device 110a for communicating the cached location data to the location server 120.

A subset of the location database may be stored locally in a memory in the mobile device 110a. The mobile device 110a may be operable, for example, to acquire the stored subset of the location database such as the location data for the RF nodes 170a and 170b from the location server 120. The cached location data may be compared with the subset of the location database stored in the mobile device 110a for redundancy check. The compared location data may be communicated by the mobile device 110a to the location server 120 based on a result of the comparison. In instances when the comparison result indicates that the location data such as the location data for the RF node 170c are not redundant data, the location data for the RF node 170c may be transmitted by the mobile device 110a to the location server 120 for updating the location database 122. In instances when the comparison result indicates that the location data such as the location data for the RF node 170a are redundant data, the location data for the RF node 170a may not be transmitted to the location server 120. The mobile device 110a may be operable to acquire the subset of the location database based on a capacity of the memory in the mobile device 110a and/or access capability of the mobile device 110a.

The location server 120 may be operable to send a subset of the location database 122 to the mobile device 110a when acquired by the mobile device 110a. The subset of the location database which is sent to the mobile device 110a may be used by the mobile device 110a to determine whether the location data collected by the mobile device 110a are redundant data comparing to the subset of the location database. In instances when the location data collected by the mobile device 110a are redundant data, the location data may not be transmitted to the location server 120 for updating the location database 122. The location server 120 may be operable to update the location database 122 utilizing the location data received from the mobile device 110a.

Figure 2:
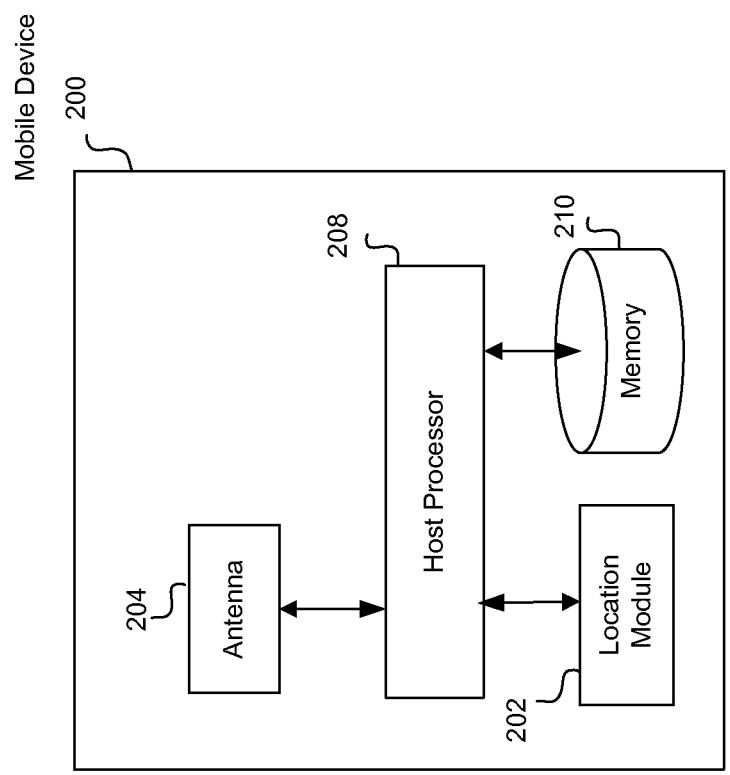
FIG. 2 is a block diagram illustrating an exemplary mobile device that is operable to optimize uploading of location data for location based services, in accordance with an embodiment of the invention.

FIG. 2 is a block diagram illustrating an exemplary mobile device that is operable to optimize uploading of location data for location based services, in accordance with an embodiment of the invention. Referring to FIG. 2, there is shown a mobile device 200. The mobile device 200 may comprise a location module 202, an antenna 204, a host processor 208 and a memory 210.

The location module 202 may comprise suitable logic, circuitry, interfaces and/or code that may be operable to collect device-assisted location data and provide or report the collected location data to the location server 120 for updating the location database 122. In an exemplary embodiment of the invention, the location module 202 may be operable to cache the collected location data for a RF node such as the RF node 170a locally in the location module 202 for deferred uploading. Resources that may be utilized for improving the uploading of the cached location data to a location server such as the location server 120 may be determined by the location module 202. The cached location data may be communicated to the location server 120 by the location module 202 utilizing the determined resources. In this regard, the location module 202 may be operable to determine an opportunistic transport based on a data usage and/or an access. The cached location data may be communicated to the location server 120 by the location module 202 utilizing the determined opportunistic transport. In this regard, for example, in instances when the data usage associated with the opportunistic transport is less than a particular cellular data usage, the opportunistic transport may be selected by the location module 202 for communicating the cached location data to the location server 120 so that the data usage may be reduced. In instances when the access to the opportunistic transport by the location module 202 becomes available, the opportunistic transport may be selected by the location module 202 for communicating the cached location data to the location server 120.

A subset of the location database may be stored locally in the memory 210. The location module 202 may be operable, for example, to acquire the stored subset of the location database such as, for example, the location data for the RF nodes 170a and 170b from the location server 120. The cached location data may be compared with the subset of the location database stored in the memory 210 for redundancy check. The compared location data may be communicated by the location module 202 to the location server 120 based on a result of the comparison. In this regard, for example, in instances when the comparison result indicates that the location data such as, for example, the location data for the RF node 170c are not redundant data, the location data for the RF node 170c may be transmitted by the location module 202 to the location server 120 for updating the location database 122. In instances when the comparison result indicates that the location data such as, for example, the location data for the RF node 170a are redundant data, the location data for the RF node 170a may not be transmitted to the location server 120. The location module 202 may be operable to acquire the subset of the location database based on, for example, a capacity of the memory 210 and/or access capability of the location module 202.

The antenna 204 may comprise suitable logic, circuitry, interfaces and/or code that may be operable to communicate radio signals over the communication network 130 using various wireless access technologies.

The host processor 208 may comprise suitable logic, circuitry, interfaces and/or code that may be operable to process signals from the antenna 204 and/or the location module 202. The host processor 208 may manage and/or control operations of the antenna 204 and/or the location module 202. The host processor 208 may be operable to communicate signals with the communication network 130 via the antenna 204. The host processor 208 may also be operable to receive A-GNSS data from the location server 120 over the antenna 204.

The memory 210 may comprise suitable logic, circuitry, interfaces and/or code that may be operable to store information such as executable instructions, data and/or database that may be utilized by the host processor 208 and the location module 202. The memory 210 may be operable to locally store a subset of the location database. The memory 210 may comprise RAM, ROM, low latency nonvolatile memory such as flash memory and/or other suitable electronic data storage.

In operation, the location module 202 may be operable to collect the location data for the RF node 170a and cache the collected location data locally in the location module 202 for deferred uploading. Resources that may be utilized for improving the uploading of the cached location data to the location server 120 may be determined by the location module 202. The cached location data may be communicated to the location server 120 by the location module 202 for updating the location database 122 utilizing the determined resources. In this regard, the location module 202 may be operable to determine an opportunistic transport based on a data usage and/or an access. The cached location data may be communicated to the location server 120 by the location module 202 utilizing the determined opportunistic transport. In instances when the data usage associated with the opportunistic transport is less than a particular cellular data usage, the opportunistic transport may be selected by the location module 202 for communicating the cached location data to the location server 120 so that the data usage may be reduced. In instances when the access to the opportunistic transport by the location module 202 becomes available, the opportunistic transport may be selected by the location module 202 for communicating the cached location data to the location server 120.

A subset of the location database may be stored locally in the memory 210. The location module 202 may be operable, for example, to acquire the stored subset of the location database such as the location data for the RF nodes 170a and 170b from the location server 120. The cached location data may be compared with the subset of the location database stored in the memory 210 for redundancy check. The compared location data may be communicated by the location module 202 to the location server 120 based on a result of the comparison. In instances when the comparison result indicates that the location data such as the location data for the RF node 170c are not redundant data, the location data for the RF node 170c may be transmitted by the location module 202 to the location server 120 for updating the location database 122. In instances when the comparison result indicates that the location data such as the location data for the RF node 170a are redundant data, the location data for the RF node 170a may not be transmitted to the location server 120. The location module 202 may be operable to acquire the subset of the location database based on a capacity of the memory 210 and/or access capability of the location module 202.

Figure 3:
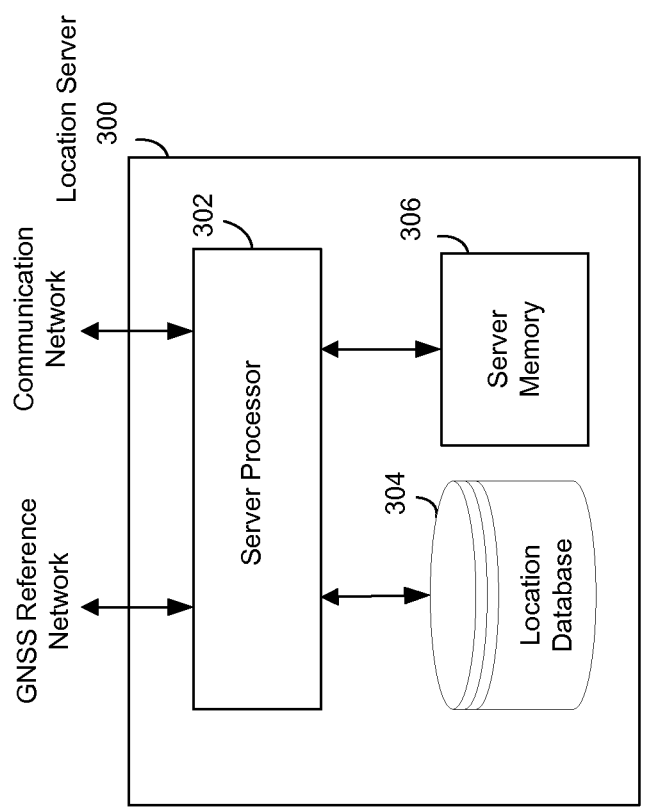
FIG. 3 is a block diagram illustrating an exemplary location server that is operable to optimize uploading of location data for location based services, in accordance with an embodiment of the invention.

FIG. 3 is a block diagram illustrating an exemplary location server that is operable to optimize uploading of location data for location based services, in accordance with an embodiment of the invention. Referring to FIG. 3, there is shown a location server 300. The location server 300 may comprise a server processor 302, a location database 304 and a server memory 306.

The server processor 302 may comprise suitable logic, circuitry, interfaces and/or code that may be operable to manage and/or control operations of the location database 304 and/or the server memory 306. The server processor 302 may be operable to communicate with the GNSS reference network 150 so as to collect GNSS satellite data by tracking GNSS constellations through the GNSS reference network 150. The server processor 302 may utilize the collected GNSS satellite data to build the location database 304, which may be coupled internally or externally to the location server 300. The server processor 302 may be operable to receive location information or data from associated users such as the mobile devices 110a-110c. The received location information or data may be stored in the location database 304 to share among associated users.

In an exemplary embodiment of the invention, the server processor 302 may be operable to send a subset of the location database 304 to the mobile device 110a when acquired by the mobile device 110a. The subset of the location database, which is sent to the mobile device 110a, may be used by the mobile device 110a to determine whether the location data for a RF node such as the RF node 170a collected by the mobile device 110a are redundant data by comparing the collected location data to the subset of the location database. In instances when the location data for the RF node 170a collected by the mobile device 110a are redundant data, the collected location data may not be transmitted to the server process 302 for updating the location database 304.

The location database 304 may comprise suitable logic, circuitry, interfaces and/or code that may be operable to store location information of associated reference devices such as, for example, the RF nodes 170a-170c. The stored location information may be provided to associated communication devices such as the mobile device 110a to support LBS applications such as location-based access control. In an exemplary embodiment of the invention, the location database 304 may be updated utilizing the location data received from the mobile devices 110a-110c. A subset of the location database 304 may be sent by the server processor 302 to the mobile device 110a for comparison.

The server memory 306 may comprise suitable logic, circuitry, interfaces and/or code that may be operable to store information such as executable instructions and data that may be utilized by the server processor 302 and/or other associated component units such as, for example, the location database 304. The server memory 306 may comprise RAM, ROM, low latency nonvolatile memory such as flash memory and/or other suitable electronic data storage.

In operation, the server processor 302 may be operable to update the location database 304 utilizing location data received from the mobile device 110a. The server processor 302 may send a subset of the location database 304 to the mobile device 110a when acquired by the mobile device 110a. The subset of the location database, which is sent to the mobile device 110a, may be used by the mobile device 110a to determine whether the location data for the RF node 170a collected by the mobile device 110a are redundant data by comparing the collected location data to the subset of the location database. In instances when the location data for the RF node 170a collected by the mobile device 110a are redundant data, the collected location data may not be transmitted to the server process 302 for updating the location database 304.

Figure 4:
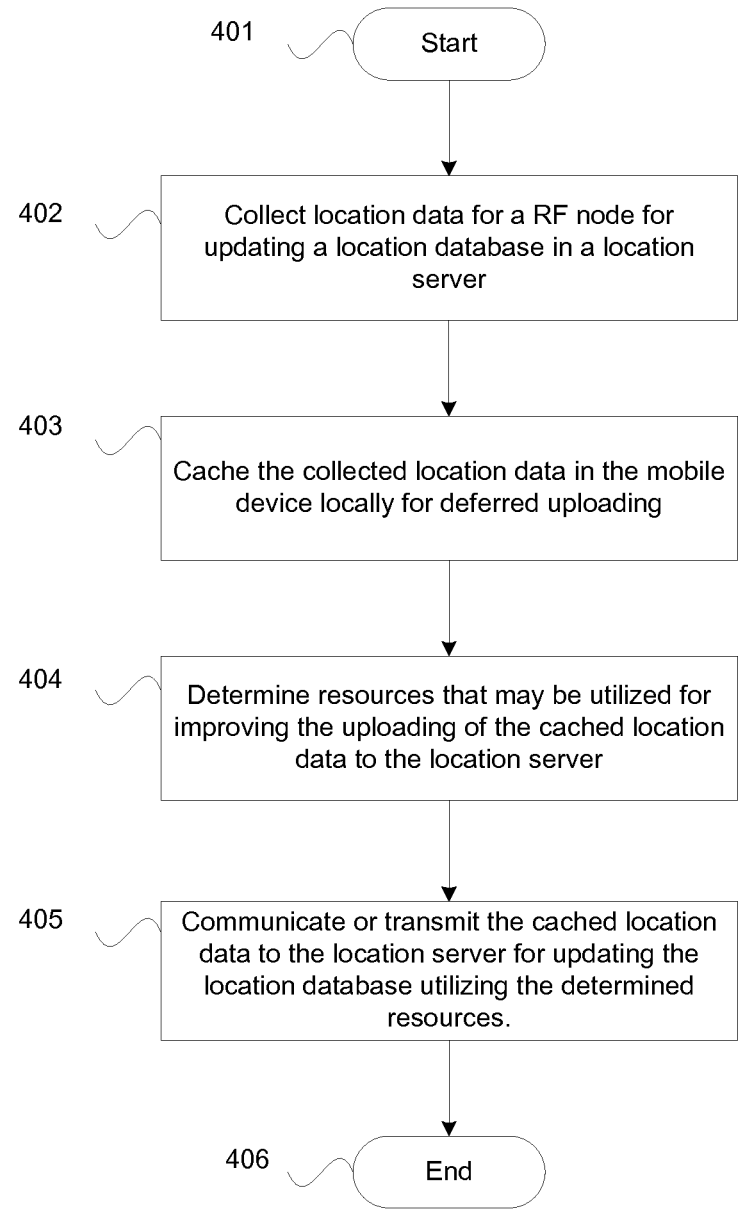
FIG. 4 is a flow chart illustrating exemplary steps for optimizing uploading of location data for location based services, in accordance with an embodiment of the invention.

FIG. 4 is a flow chart illustrating exemplary steps for optimizing uploading of location data for location based services, in accordance with an embodiment of the invention. Referring to FIG. 4, the exemplary steps start at step 401. In step 402, the location module 202 in the mobile device 200 may be operable to collect location data for a RF node 170a for updating a location database 122 in a location server 120. In step 403, the collected location data is cached in the location module 202 for deferred uploading. In step 404, the location module 202 may be operable to determine resources that may be utilized for improving the uploading of the cached location data to the location server 120. In step 405, the cached location data in the location module 202 may be communicated or transmitted by the location module 202 to the location server 120 for updating the location database 122 utilizing the determined resources. The exemplary steps may proceed to the end step 406.

In various embodiments of the invention, a mobile device 200 may be operable to collect location data for a RF node 170a and cache the collected location data locally in a location module 202 in the mobile device 200 for deferred uploading. Resources that may be utilized for improving the uploading of the cached location data to a location server 120 may be determined by the mobile device 110a. The cached location data may be communicated to the location server 120 by the mobile device 110a utilizing the determined resources. The location server 120 may comprise a location database 122 which may then be updated utilizing the location data received from the mobile device 110a. In this regard, the mobile device 110a may be operable to determine an opportunistic transport based on a data usage and/or an access. The cached location data may be communicated to the location server 120 by the mobile device 110a utilizing the determined opportunistic transport. In this regard, for example, in instances when the data usage associated with the opportunistic transport is less than a particular cellular data usage, the opportunistic transport may be selected by the mobile device 110a for communicating the cached location data to the location server 120. In instances when the access to the opportunistic transport by the mobile device 110a becomes available, the opportunistic transport may be selected by the mobile device 110a for communicating the cached location data to the location server 120.

A subset of the location database may be stored locally in the memory 210 in the mobile device 200. The mobile device 110a may be operable to acquire the stored subset of the location database from the location server 120, for example. The cached location data may be compared with the subset of the location database stored in the memory 210 for redundancy check. The compared location data may be communicated by the mobile device 110a to the location server 120 based on a result of the comparison. In this regard, for example, in instances when the result of the comparison indicates that the location data are not redundant data, the location data may be transmitted by the mobile device 110a to the location server 120 for updating the location database 122. In instances when the comparison result indicates that the location data are redundant data, the location data may not be transmitted to the location server 120. The mobile device 200 may be operable to acquire the subset of the location database based on, for example, a capacity of the memory 210 in the mobile device 200 and/or access capability of the location module 202 in the mobile device 200.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for optimizing uploading of location data for location based services.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a mobile device, the method comprising:
   identifying, by said mobile device, a first transport to upload collected location data to a location server;
   caching, by said mobile device, said collected location data corresponding to a node of a communication network in said mobile device;
   identifying, by said mobile device, a plurality of resources for uploading said cached collected location data to said location server;
   identifying, by said mobile device, a second transport to upload said cached collected location data to said location server based upon a resource from among said identified plurality of resources, said second transport being characterized as improving uploading of said cached collected location data to said location server as compared to uploading said cached collected location data using said first transport; and
   communicating, by said mobile device, said cached collected location data to said location server utilizing said second transport.

2. The method according to claim 1, wherein said identifying said second transport comprises:
   identifying said second transport for said communicating of said cached collected location data to said location server based on a parameter.

3. The method according to claim 2, wherein said parameter comprises:
   a data usage, and
   wherein said identifying further comprises:
   identifying said second transport for said communicating of said cached collected location data to said location server when said data usage associated with said second transport is less than a particular cellular data usage.

4. The method according to claim 2, wherein said parameter comprises:
   a cost, and
   wherein said identifying further comprises:
   identifying said second transport for said communicating of said cached collected location data to said location server when said cost associated with said second transport is less than a cellular data usage charge for said mobile device.

5. The method according to claim 1, further comprising:
   comparing said cached collected location data with a subset of a location database for a redundancy check, wherein said subset of said location database is stored locally in said mobile device, and
   wherein said communicating comprises:
   communicating said cached collected location data to said location server based on said comparison.

6. The method according to claim 5, wherein said communicating further comprises:
   communicating said cached collected location data to said location server when said cached collected location data is not redundant.

7. The method according to claim 5, wherein said communicating further comprises:
   not communicating said cached collected location data to said location server when said cached collected location data is redundant.

8. The method according to claim 5, further comprising:
   acquiring said subset of said location database from said location server.

9. The method according to claim 8, further comprising:
   acquiring said subset of said location database based on a capacity of a memory in said mobile device or an access capability of said mobile device.

10. The method according to claim 1, further comprising:
    updating, using said location server, said location database utilizing said cached collected location data.

11. A system for communication, comprising:
    one or more processors or circuits for use in a mobile device, said one or more processors or circuits being configured to:
    identify a first transport to upload collected location data to a location server;
    cache said collected location data corresponding to a node of a communication network in said mobile device;
    identify a plurality of resources for uploading said cached collected location data to said location server;
    identify a second transport to unload said cached collected location data to said location server based upon a resource from among said identified plurality resources, said second transport being characterized as improving uploading of said cached collected location data to said location server as compared to uploading said cached collected location data using said first transport; and
    communicate said cached collected location data to said location server utilizing said second transport.

12. The system according to claim 11, wherein said one or more processors or circuits are configured to identify said second transport for said communicating of said cached collected location data to said location server based on a parameter.

13. The system according to claim 12, wherein said parameter comprises:
    a data usage, and
    wherein said one or more processors or circuits are configured to identify said second transport for said communicating of said cached collected location data to said location server when said data usage associated with said second transport is less than a particular cellular data usage.

14. The system according to claim 12, wherein said parameter comprises:
    a cost, and
    wherein said one or more processors or circuits are configured to identify said second transport for said communicating of said cached collected location data to said location server when a cost associated with said second transport is less than a cellular data usage charge for said mobile device.

15. The system according to claim 11, wherein said one or more processors or circuits are further configured to:
    compare said cached collected location data with a subset of a location database for a redundancy check, wherein said subset of said location database is stored locally in said mobile device; and
    communicate said cached collected location data to said location server based on said comparison.

16. The system according to claim 15, wherein said one or more processors or circuits are configured to communicate said cached collected location data to said location server when said cached collected location data is not redundant.

17. The system according to claim 15, wherein said cached collected location data is not communicated to said location server when said cached collected location data is redundant.

18. The system according to claim 15, wherein said one or more processors or circuits are further configured to acquire said subset of said location database from said location server.

19. The system according to claim 18, wherein said one or more processors or circuits are configured to acquire said subset of said location database based on a capacity of a memory in said mobile device or an access capability of said mobile device.

20. The system according to claim 11, wherein said location server is configured to update a location database utilizing said cached collected location data.

* * * * *

UNITED STATES PATENT AND TRADEMARK OFFICE
CERTIFICATE OF CORRECTION

PATENT NO.         : 9,020,522 B2                                                   Page 1 of 1
APPLICATION NO.    : 12/732874
DATED              : April 28, 2015
INVENTOR(S)        : Murray et al.

It is certified that error appears in the above-identified patent and that said Letters Patent is hereby corrected as shown below:

In the Claims

Column 12, line 20, Claim 11, please replace "identify a second transport to unload" with --identify a second transport to upload--.

Signed and Sealed this
Eleventh Day of August, 2015

Michelle K. Lee
*Director of the United States Patent and Trademark Office*